United States Patent
Wei

(10) Patent No.: US 6,604,422 B2
(45) Date of Patent: Aug. 12, 2003

(54) VIBRATION SENSOR DEVICE

(76) Inventor: Jung-Tsung Wei, No. 176, Section 2, Tong-Man Road, Tainan City (TW)

( * ) Notice: Subject to any disclaimer, the term of this patent is extended or adjusted under 35 U.S.C. 154(b) by 90 days.

(21) Appl. No.: 09/972,977

(22) Filed: Oct. 10, 2001

(65) Prior Publication Data

US 2003/0066353 A1 Apr. 10, 2003

(51) Int. Cl.[7] .............................................. G01P 15/00
(52) U.S. Cl. ................ 73/652; 73/514.01; 200/61.45 R; 200/61.52; 340/669; 340/687; 340/689
(58) Field of Search ............................... 73/514.01, 652; 200/61.45 R, 61.52; 340/665, 666, 667, 669, 683, 686.1, 687, 689

(56) References Cited

U.S. PATENT DOCUMENTS

| | | | | |
|---|---|---|---|---|
| 3,812,308 A | * | 5/1974 | Bell et al. | 200/61.45 R |
| 3,927,286 A | * | 12/1975 | Fohl | 200/61.45 R |
| 4,337,402 A | * | 6/1982 | Nowakowski | 307/121 |
| 4,884,067 A | * | 11/1989 | Nordholm et al. | 340/686 |
| 5,006,676 A | * | 4/1991 | Bogut et al. | 200/61.52 |
| 5,136,127 A | * | 8/1992 | Blair | 200/61.52 |
| 5,153,566 A | * | 10/1992 | Yun | 340/689 |
| 5,610,590 A | * | 3/1997 | Johnson et al. | 340/573 |
| 5,698,827 A | * | 12/1997 | Turjancik | 200/61.45 R |
| 5,747,762 A | * | 5/1998 | Fukuda et al. | 200/61.45 R |
| 5,987,988 A | * | 11/1999 | Kunimi et al. | 73/514.01 |

\* cited by examiner

Primary Examiner—Richard A. Moller
(74) Attorney, Agent, or Firm—Alan D. Kamrath; Rider, Bennett, Egan & Arundel, LLP.

(57) ABSTRACT

A vibration sensor device includes a hollow casing having a plurality of protrusions extending from an inner periphery of the casing. A ball is received in the casing and located in contact with at least three of the protrusions. The ball freely rolls when the casing senses vibration and the ball contacts different protrusions when it rolls so as to activate a cooperated warning device.

12 Claims, 8 Drawing Sheets

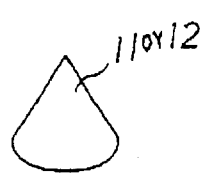 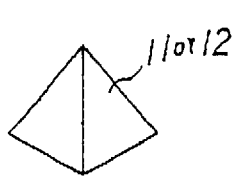 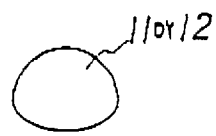 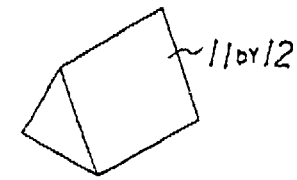
FIG.7a    FIG.7b    FIG.7c    FIG.7d
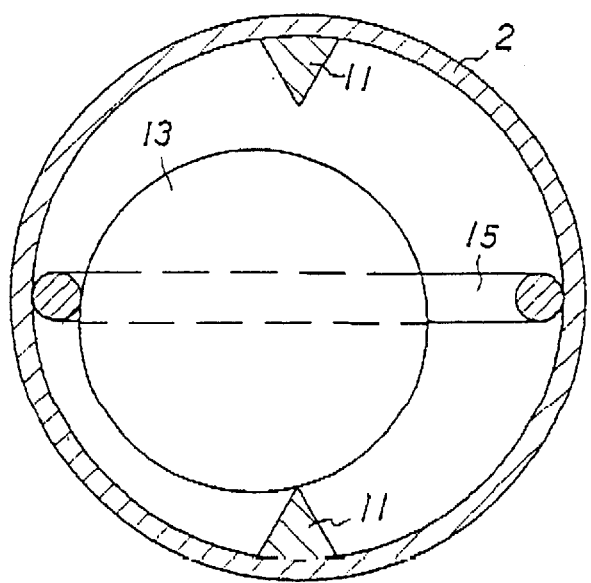
FIG.8

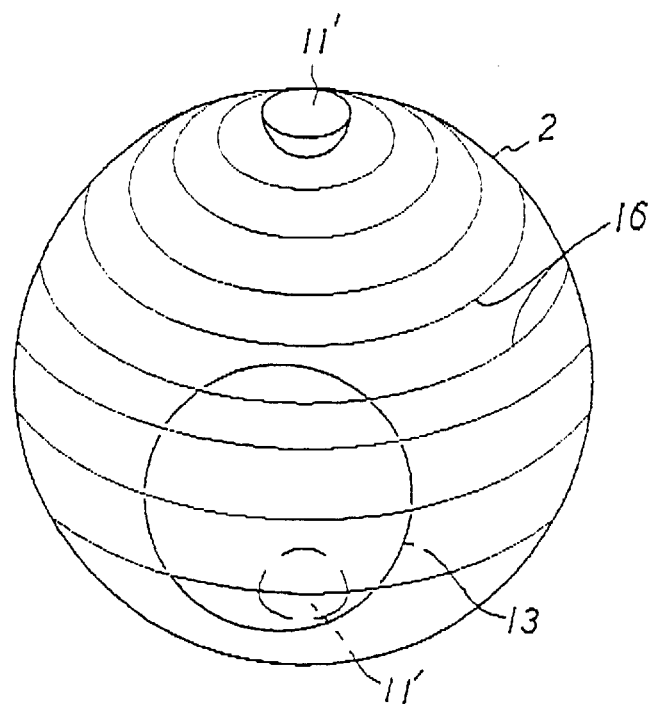
F I G. 11
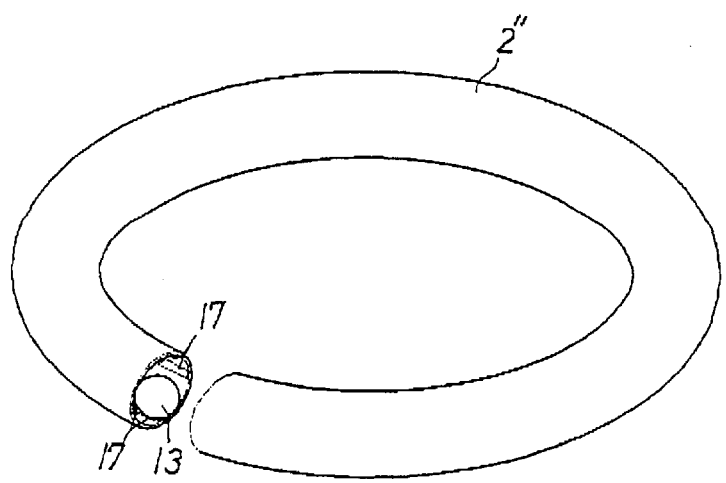
F I G. 12

VIBRATION SENSOR DEVICE

FIELD OF THE INVENTION

The present invention relates to a vibration sensor device having a plurality of protrusions extending from an inner periphery of a casing and a ball freely contacts at least three protrusions so that the device can be installed without orientation limitation.

BACKGROUND OF THE INVENTION

A conventional vibration sensor device generally includes a longitudinal casing and mercury is received in the casing so that when the casing is vibrated, the level of the mercury is changed to activate a cooperated switch or the like. The other one of the convention vibration sensor device employs a ball supported in a casing and the ball falls when vibration is sensed. These two conventional vibration sensor devices are required to be installed vertically relative to the ground so that they have limitation when being used for different sites or situations. Even though they could be tilted at an angle, the angle is limited with 45 degrees and this cannot meet requirements of users. Besides, the sensor device that employs mercury has a environmental problem when it is to be discarded.

SUMMARY OF THE INVENTION

In accordance with one aspect of the present invention, there is provided a vibration sensor device which comprises a hollow casing with a plurality of protrusions extending from an inner periphery of the casing. A ball is received in the casing and located in contact with at least three of the protrusions.

The primary object of the present invention is to provide a vibration sensor device that can be installed without angle or orientation limitation The present invention will become more obvious from the following description when taken in connection with the accompanying drawings which show, for purposes of illustration only, preferred embodiments in accordance with the present invention.

BRIEF DESCRIPTION OF THE DRAWINGS

FIGS. 7a to 7d show different types of protrusions;

FIG. 8 shows the protrusions are an annular loop and cones;

FIG. 11 shows the casing is a sphere and a plurality of annular ribs are in the casing;

FIG. 12 shows the casing is a hollow loop;

DETAILED DESCRIPTION OF THE PREFERRED EMBODIMENTS

Figure 1:
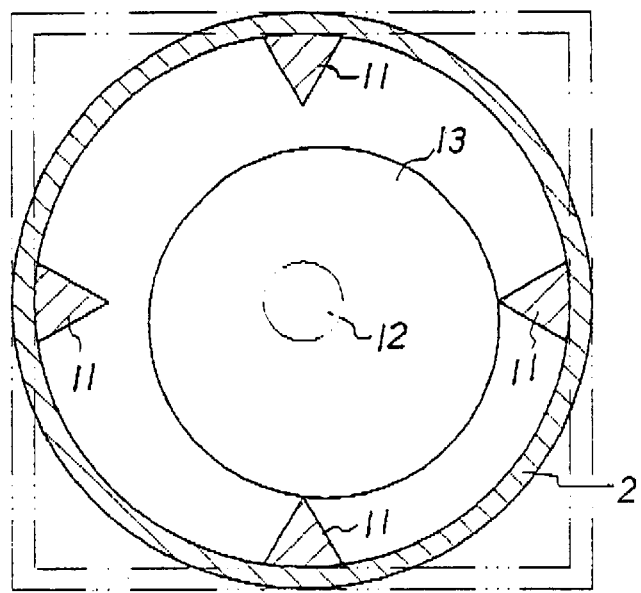
FIG. 1 is a cross sectional view to show the vibration sensor device of the present invention.
Figure 2:
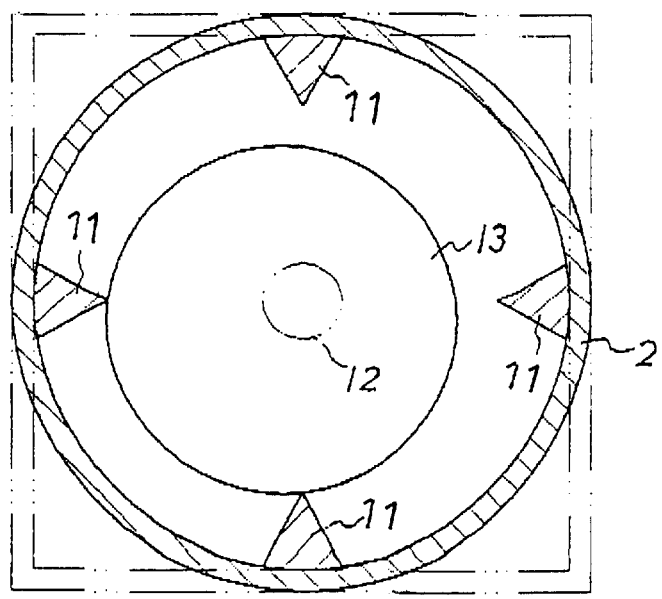
FIG. 2 is a cross sectional view to show the ball rolls in the casing of the vibration sensor device of the present invention.
Figure 3:
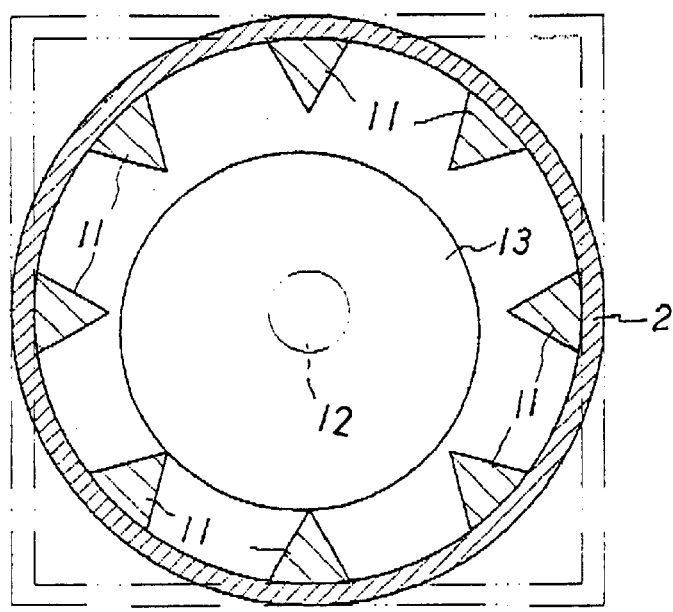
FIG. 3 is a cross sectional view to show more protrusions are used in the vibration sensor device of the present invention.

Referring to FIGS. 1 and 2, the vibration sensor device of the present invention comprises a hollow sphere casing 2 having a plurality of cone-shaped protrusions 11, 12 extending from an inner periphery of the casing 2. A ball 13 is received in the casing 2 and located in contact with at least three of the protrusions 11, 12. It is to be noted that the three protrusions 11, 11, 12 that contact the ball 13 are located in X, Y, and Z axles so that the casing 2 can be installed without orientation limitation. When the casing 2 senses a vibration, the ball 13 rolls in the casing 2 and contacts different protrusions 11 so as to activate cooperated warning device (not shown). The sensitivity of the device can be decided by the number of the protrusions 11 so that the more protrusions 11 are used, the higher sensitivity is obtained such as the embodiment shown in FIG. 3.

Figure 4:
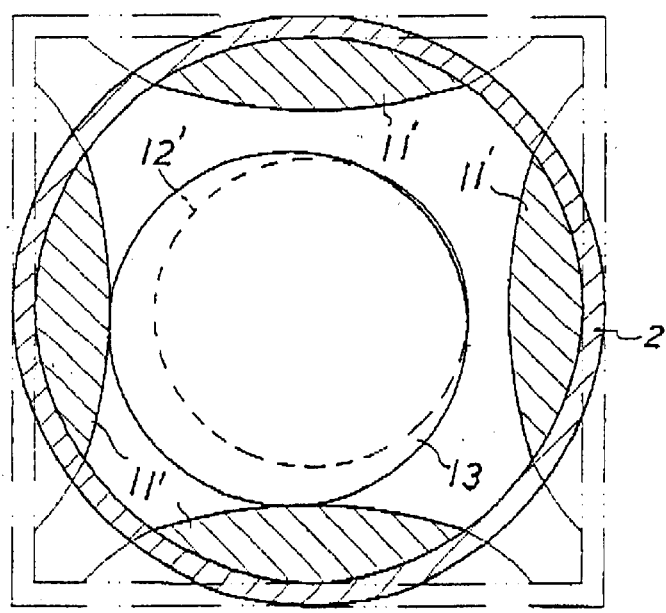
FIG. 4 is a cross sectional view to show the protrusions are convex surfaces.
Figure 5:
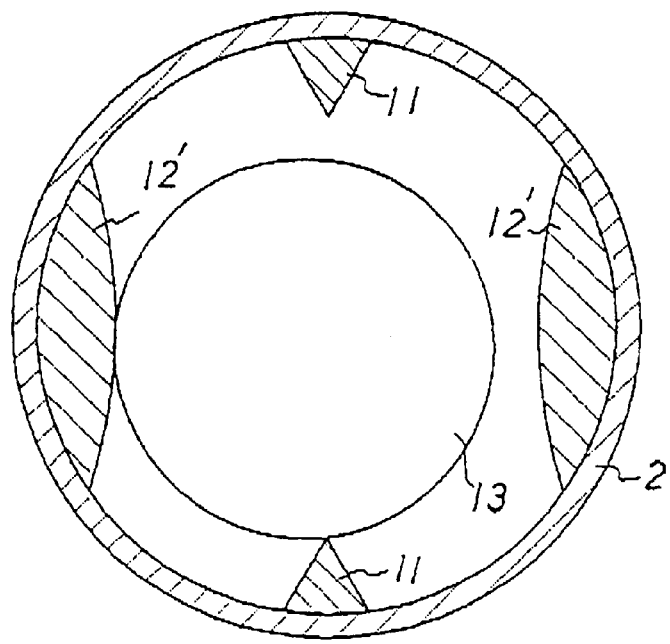
FIG. 5 is a cross sectional view to show the protrusions are cones and convex surfaces.

FIG. 4 shows that the protrusions 11', 12' can be convex surfaces or a combination of the cone-shaped protrusions 11' and the convex surfaces 12' as shown in FIG. 5.

Figure 6:
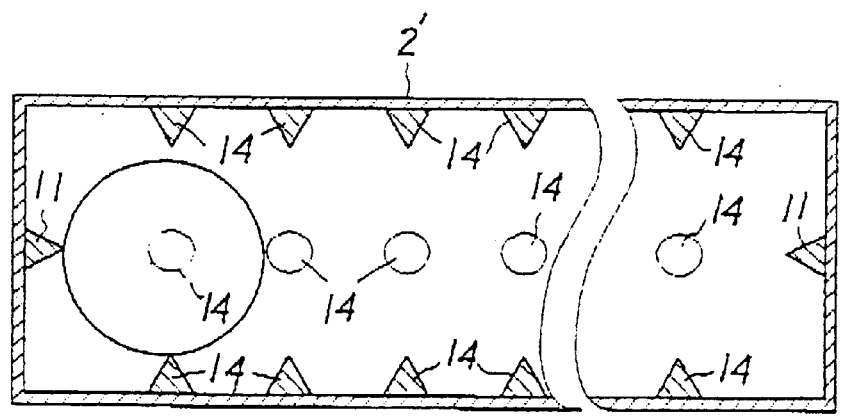
FIG. 6 shows the casing is a cylindrical casing.

FIG. 6 shows that the casing 2' is a cylindrical casing and the con-shaped protrusions 11 are located on two inner ends and the other con-shaped protrusions 14 are located on the lengthwise inner surface of the casing 2.

FIGS. 7a to 7d show that the shapes of the protrusions 11, 12 can be cones, quadrilateral pyramids, rounded bosses or triangular prisms. FIG. 8 shows that the protrusions can be an annular loop 15 and cones 11.

Figure 9:
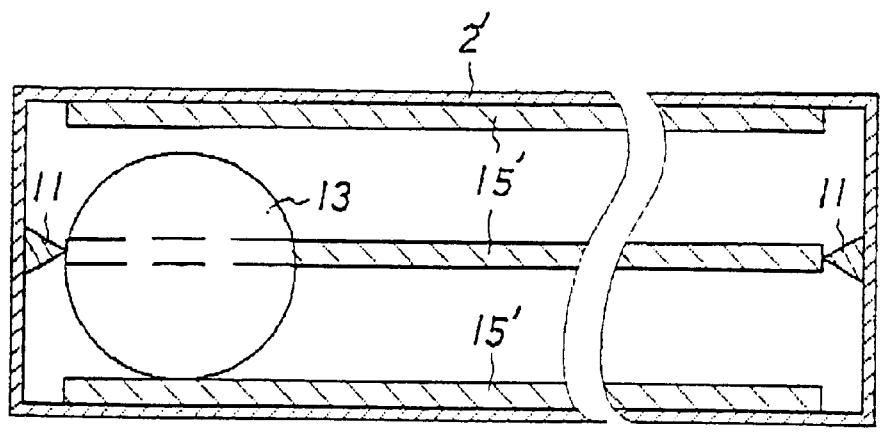
FIG. 9 shows the protrusions are support ribs and cones in a cylindrical casing.
Figure 10:
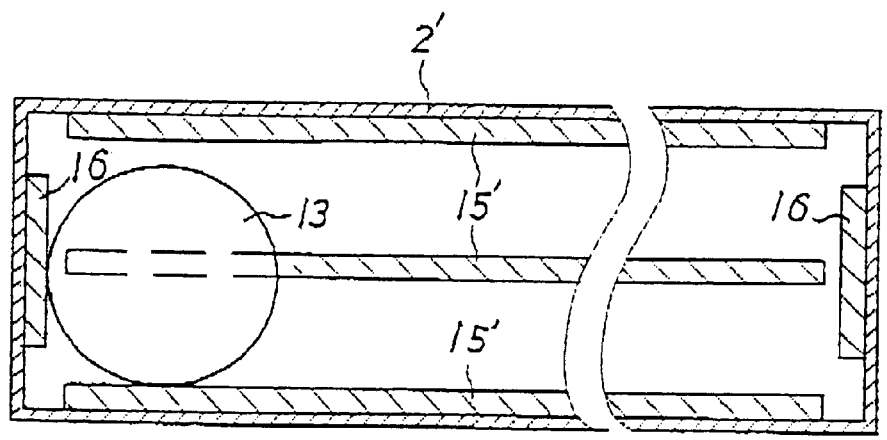
FIG. 10 shows the protrusions are support ribs.

FIG. 9 shows that the protrusions are support ribs 15' on the lengthwise inner surface of the cylindrical casing 2' and two cones 11 are located on the two inner ends of the cylindrical casing 2'. FIG. 10 shows the two cones 11 on the two inner ends of the cylindrical casing 2' as shown in FIG. 9 are replaced with the support ribs 16.

FIG. 11 shows that a plurality of annular loops 16 extend inward from the inner periphery of a sphere casing 2 at an equal interval and two rounded bosses 11' are located on two poles of the sphere casing 2.

FIG. 12 shows the casing is a hollow loop 2" and support ribs 17 are located on the inner periphery of the hollow loop 2" and the ball 13 contacts the support ribs 17.

Figure 13:
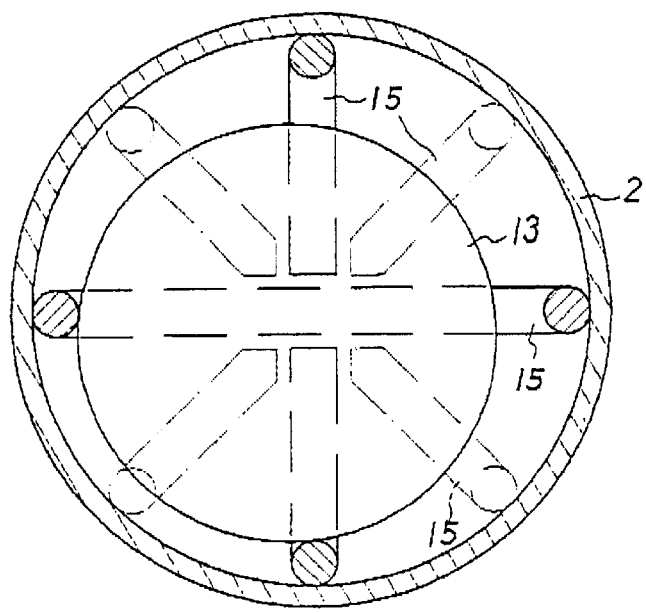
FIG. 13 shows the protrusions are short sections of support ribs.
Figure 14:
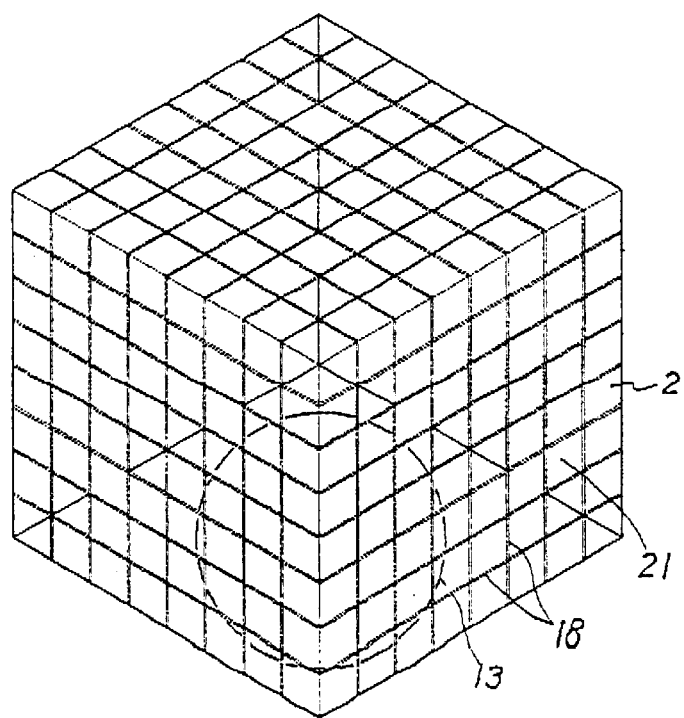
FIG. 14 shows the casing is a rectangular casing and support ribs are located in altitude and latitude directions.
Figure 15:
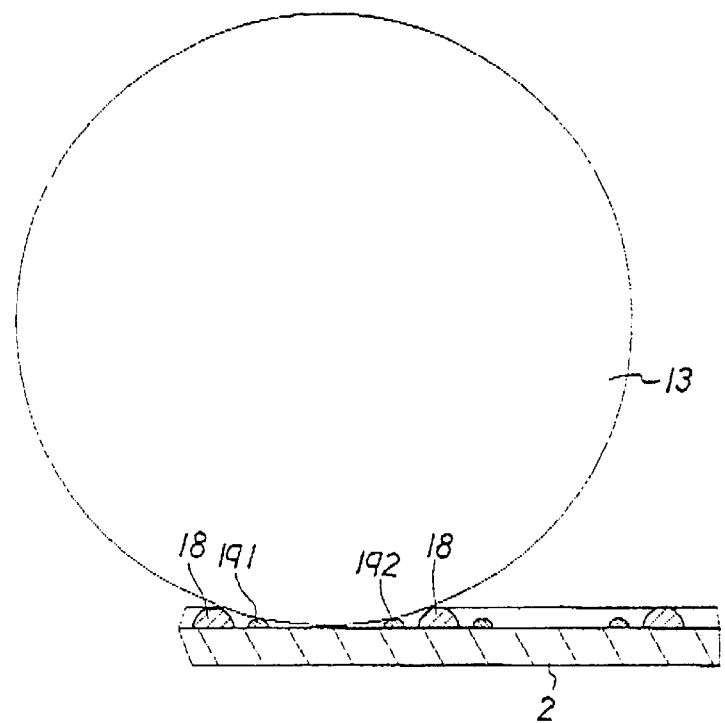
FIG. 15 shows protrusions located between the support ribs.

FIG. 13 shows the protrusions are short sections of support ribs 15 in a sphere casing 2. FIGS. 14 and 15 show that the casing is a rectangular casing 2 and the support ribs 18 are located in altitude and latitude directions of the casing 2. The protrusions 191, 192 are located between the support ribs 18, the ball 13 is supported on the support ribs 18 and contacts the protrusions 191, 192.

Figure 16:
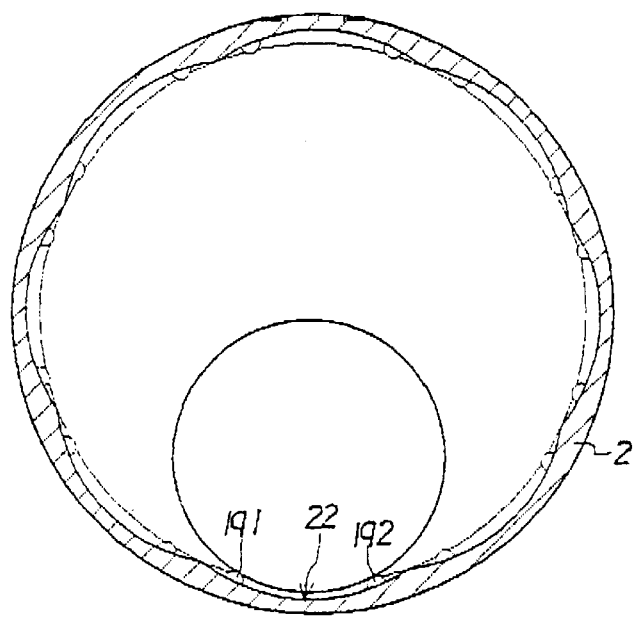
FIG. 16 shows a plurality of recesses are defined in the casing and protrusions extend from an inside of each of the recesses.

FIG. 16 shows a plurality of recesses 22 are defined in the sphere casing 2 and the protrusions 191, 192 extend from an inside of each of the recesses 22. The ball 13 is located in one of the recesses 22 and contacts the protrusions 191, 192.

While we have shown and described the embodiment in accordance with the present invention, it should be clear to those skilled in the art that further embodiments may be made without departing from the scope of the present invention.

What is claimed is:

1. A vibration sensor device comprising:
   a hollow casing having a plurality of protrusions extending from an inner periphery of said casing, and
   a ball received in said casing and located in contact with at least three of said protrusions.

2. The device as claimed in claim 1, wherein said casing is a sphere casing.

3. The device as claimed in claim 1, wherein said casing is a cylindrical casing.

4. The device as claimed in claim 1, wherein said casing is a hollow loop.

5. The device as claimed in claim 1, wherein said protrusions are cones.

6. The device as claimed in claim 1, wherein said protrusions are quadrilateral pyramids.

7. The device as claimed in claim 1, wherein said protrusions are triangular prisms.

8. The device as claimed in claim 1, wherein said protrusions are rounded bosses.

9. The device as claimed in claim 1, wherein said protrusions are convex surfaces.

10. The device as claimed in claim 1, wherein said protrusions are an annular loop.

11. The device as claimed in claim 1 further comprising a plurality of recesses defined in said inner periphery of said casing and said protrusions extending from an inside of each of said recesses.

12. The device as claimed in claim 1, wherein said casing has a plurality of support ribs on said inner periphery thereof and said protrusions extend from said inner periphery of said casing, said ball supported on said support ribs and contacting said protrusions between said support ribs.

* * * * *